United States Patent
Shelton et al.

(10) Patent No.: US 11,977,172 B2
(45) Date of Patent: *May 7, 2024

(54) TRAFFIC RADAR SYSTEM WITH PATROL VEHICLE SPEED DETECTION

(71) Applicant: Kustom Signals, Inc., Lenexa, KS (US)

(72) Inventors: Maurice Shelton, Buffalo, KS (US); Roger Adwell, Chanute, KS (US)

(73) Assignee: Kustom Signals, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,671

(22) Filed: Sep. 27, 2023

(65) Prior Publication Data
US 2024/0019590 A1 Jan. 18, 2024

Related U.S. Application Data

(63) Continuation of application No. 18/328,254, filed on Jun. 2, 2023, which is a continuation of application No. 17/845,115, filed on Jun. 21, 2022, now Pat. No. 11,703,602, which is a continuation of application No. 17/196,313, filed on Mar. 9, 2021, now Pat. No. (Continued)

(51) Int. Cl.
*G01S 19/52* (2010.01)
*G01S 13/931* (2020.01)
*G01S 19/47* (2010.01)

(52) U.S. Cl.
CPC .............. *G01S 19/52* (2013.01); *G01S 19/47* (2013.01); *G01S 13/931* (2013.01); *G01S 2013/93271* (2020.01); *G01S 2013/93272* (2020.01)

(58) Field of Classification Search
None
See application file for complete search history.

(56) References Cited

U.S. PATENT DOCUMENTS

| 5,504,488 A | 4/1996 | Henderson et al. |
| 5,525,996 A | 6/1996 | Aker et al. |

(Continued)

OTHER PUBLICATIONS

Mohd Shariff, Khairul Khaizi, et al. "Comparison of adaptive spectral estimation for vehicle speed measurement with radar sensors", Sensors 17.4, (2017), ("Mohd"), 17 pages.

(Continued)

*Primary Examiner* — Whitney Moore
(74) *Attorney, Agent, or Firm* — Hovey Williams LLP

(57) ABSTRACT

A traffic radar system comprises a first radar transceiver, a second radar transceiver, a speed determining element, and a processing element. The first radar transceiver transmits and receives radar beams and generates a first electronic signal corresponding to the received radar beam. The second radar transceiver transmits and receives radar beams and generates a second electronic signal corresponding to the received radar beam. The speed determining element determines and outputs a speed of the patrol vehicle. The processing element is configured to receive a plurality of digital data samples derived from the first or second electronic signals, receive the speed of the patrol vehicle, process the digital data samples to determine a relative speed of at least one target vehicle in the front zone or the rear zone, and convert the relative speed of the target vehicle to an absolute speed using the speed of the patrol vehicle.

9 Claims, 11 Drawing Sheets

Related U.S. Application Data 11,579,314, which is a continuation-in-part of application No. 16/137,860, filed on Sep. 21, 2018, now Pat. No. 11,194,039.

(60) Provisional application No. 62/570,446, filed on Oct. 10, 2017, provisional application No. 62/569,667, filed on Oct. 9, 2017, provisional application No. 62/569,923, filed on Oct. 9, 2017.

(56) References Cited

U.S. PATENT DOCUMENTS

| | | | |
|---|---|---|---|
| 5,528,245 A | 6/1996 | Aker et al. | |
| 5,528,246 A | 6/1996 | Henderson et al. | |
| 5,563,603 A | 10/1996 | Aker et al. | |
| 5,565,871 A | 10/1996 | Aker et al. | |
| 5,570,093 A | 10/1996 | Aker et al. | |
| 5,691,724 A | 11/1997 | Aker et al. | |
| 6,023,236 A | 2/2000 | Shelton | |
| 6,198,427 B1 | 3/2001 | Aker et al. | |
| 6,353,781 B1 | 3/2002 | Spivak | |
| 6,501,418 B1 | 12/2002 | Aker | |
| 6,580,386 B1 | 6/2003 | Aker et al. | |
| 6,646,591 B2 | 11/2003 | Aker et al. | |
| 6,744,379 B1 | 6/2004 | Aker et al. | |
| 6,798,374 B1 | 9/2004 | Smith | |
| 6,831,593 B2 | 12/2004 | Aker et al. | |
| 6,853,314 B1 | 2/2005 | Aker et al. | |
| 7,068,212 B2 | 6/2006 | Aker et al. | |
| 7,091,901 B2 | 8/2006 | Shelton et al. | |
| 7,173,569 B1 | 2/2007 | Smith | |
| 7,218,271 B2 | 5/2007 | Aker et al. | |
| 7,227,494 B2 | 6/2007 | Aker | |
| 7,411,544 B2 | 8/2008 | Aker et al. | |
| 7,444,240 B2 | 10/2008 | Macneille et al. | |
| 7,460,950 B2 | 12/2008 | Wurth | |
| 7,705,772 B1 | 4/2010 | Shelton | |
| 7,856,870 B2 | 12/2010 | Nakao | |
| 9,274,224 B2 | 3/2016 | McCord et al. | |
| 9,449,507 B2 | 9/2016 | Basir | |
| 9,482,751 B2 | 11/2016 | Mandava et al. | |
| 9,791,294 B2 | 10/2017 | Rothschild | |
| 9,871,993 B2 | 1/2018 | Vanman et al. | |
| 10,360,795 B2 | 7/2019 | Okamura et al. | |
| 10,488,426 B2 | 11/2019 | Mandava et al. | |
| 10,661,797 B2 | 5/2020 | Chack et al. | |
| 11,194,039 B2 | 12/2021 | Shelton | |
| 2004/0227661 A1 | 11/2004 | Godsy | |
| 2010/0121524 A1* | 5/2010 | Wheatley | G01C 25/00 701/33.4 |

OTHER PUBLICATIONS

Torres-Guijarro, Soledad, et al. "A traffic radar verification system based on GPS—Doppler technology." Measurement, 43.10, (2010), ("Torres"), 8 pages.

OceanLink—GPS speedometer ("Oceanlink"); 2 pages.

Ruth, Richard, and Timothy Brown. 2009 Crown Victoria PCM EDR Accuracy in Steady State and ABS Braking Conditions, No. 2010-01-1000, SAE Technical Paper, 2010, ("Ruth"), 13 pages.

SPEEDBOX Instruction Manual © Race Technology Limited, 2008, Version 1.0, ("Speedbox"), 29 pages.

Suciu, Claudiu Valentin. "Ride-comfort of an automobile equipped with colloidal dampers at its frontal suspensions", Proc. Int. Conf. on Noise and Vibration Eng., 2010, ("Suciu"), 14 pages.

Siuhi, Saidi, and Judith Mwakalonge. "Opportunities and challenges of smart mobile applications in transportation", Journal of traffic and transportation engineering, (English edition), 3.6, (2016): 582-592 ("Siuhu"), 11 pages.

VBOX III 100Hz GPS Speed Sensor User Guide (hereinafter "VBOX III"), 21 pages.

VB2SX20SPS 20Hz GPS Speed Sensor User Guide, rev. 5 (hereinafter "VBOX 20"), 24 pages.

10Hz Speed Sensor RLVB10SPS Instruction Manual. Rev. 8 (hereinafter "VBOX 10"), 22 pages.

P/N 30-0313 X-series gauge GPS speedometer ("AEM"), 10 pages.

SE868Kx-Ax Family Product User Guide, Rev. 2 ("SE868"), 77 pages.

Stalker CAN/VSS brochure ("Stalker CAN/VSS Brochure"), 2016, 1 page.

Jeddi, Sayed Erfan, et al. "Design and Implementation of an Over-Speed Monitoring and Recording System.", (2016): 1-6 ("Jeddi"), 5 pages.

Xu, Chengfa, et al. "Comparison of Speed over Ground Estimation Using Acoustic and Radar Doppler Sensors.", 4 pages.

* cited by examiner

SPEED DATA MESSAGE $GPRMC,082653.100,A,2446.4768,N,12100.0344,E,0.00,128.42,270705,,,A*67<CR><LF>

*Fig. 5.*

SPEED DATA MESSAGE FORMAT

| FIELD | EXAMPLE | COMMENTS |
|---|---|---|
| PREAMBLE | $ | START OF SENTENCE |
| TALKER ID | GP | NAVIGATION SYSTEM<br>GP=GPS<br>GL=GLONASS<br>GN=GLOBAL NAVIGATIO<br>BD=BEIDOU (COMPASS) |
| SENTENCE ID | RMC | RECOMMENDED MINIMUM SPECIFIC GNSS DATA |
| UTC TIME | 082653.100 | HHMMSS.SSS (HOURS, MINUTES, SECONDS) |
| DATA VALID STATUS | A | A=DATA VALID<br>V=NAVIGATION RECEIVER WARNING (DATA INVALID |
| LATITUDE<br>N/S INDICATOR | 2446.4768<br>N | DDMM.MMMM (DEGREES AND MINUTES)<br>N = NORTH, S = SOUTH |
| LONGITUDE<br>E/W INDICATOR | 12100.0344<br>E | DDDMM.MMMM (DEGREES AND MINUTES)<br>E = EAST, W = WEST |
| SPEED OVER GROUND | 0.00 | KNOTS |
| COURSE OVER GROUND | 128.42 | DEGREES TRUE |
| UTC DATE | 270705 | DDMMYY (DAY, MONTH, YEAR) |
| MAGNETIC VARIATION<br>MAGNETIC VARIATION | | DEGREES MAGNETIC<br><br>E = EAST, W = WEST |
| MODE INDICATOR | A | A = AUTONOMOUS MODE<br>D = DIFFERENTIAL MODE<br>E = ESTIMATED (DEAD RECKONING) MODE<br>M = MANUAL INPUT MODE<br>S = SIMULATOR MODE<br>N = DATA NOT VALID |
| END OF DATA FIELDS | * | ASTERISK DELIMITER |
| CHECKSUM | 67 | TWO CHARACTER HEXADECIMAL VALUE |
| TERMINATOR | <CR><LF> | END OF SENTENCE SEQUENCE |

*Fig. 6.*

DATA PACKET FORMAT

| RECORD NUMBER: | 00101 |
|---|---|
| RECORD TYPE: | LOCKED SPEEDS EVENT |
| UTC TIME: | 09:14:32 |
| UTC DATE: | 27-09-2017 |
| LOCATION: | 37.6792N, 95.4572W |
| PATROL COURSE: | 273 DEGREES |
| PATROL SPEED: | 65 MPH |
| TARGET SPEED: | 80 MPH |
| OPERATING MODE: | MOVING SAME DIRECTION |

GNSS MODULE DATA PACKET OUTPUT $GPVTG,309.62,T,,,0.13,N,0.2,K,A*4E<CR><LF>

Fig. 12.

FORMAT OF GNSS MODULE DATA PACKET OUTPUT

| FIELD | EXAMPLE | DESCRIPTION |
|---|---|---|
| Talker ID | GP | Navigation System<br>GP = GPS<br>GL = GLONASS<br>BD = BEIDOU (BDS)<br>GA = GALILEO<br>GN = Global Navigation/Multi-constellation |
| Sentence ID | VTG | Course over Ground and Ground Speed |
| Course Over Ground | 309.62 | Measured heading, degrees |
| Reference | T | True |
| Course Over Ground | - | NULL, field not supported |
| Reference | - | NULL, field not supported |
| Speed Over Ground | 0.13 | Measured horizontal speed |
| Units | N | Knots |
| Speed Over Ground | 0.2 | Measured horizontal speed |
| Units | K | Km/h |
| Mode | A | A = Autonomous mode<br>D = Differential mode<br>E = Estimated (dead reckoning) mode<br>N = Data not valid |

Fig. 13.

TRAFFIC RADAR SYSTEM WITH PATROL VEHICLE SPEED DETECTION

CROSS-REFERENCE TO RELATED APPLICATIONS

The current patent application is a continuation patent application which claims priority benefit, with regard to all common subject matter, to a continuation patent application with U.S. patent application Ser. No. 18/328,254, entitled "TRAFFIC RADAR SYSTEM WITH PATROL VEHICLE SPEED DETECTION", filed Jun. 2, 2023, which claims priority benefit, with regard to all common subject matter, to a continuation patent application with U.S. patent application Ser. No. 17/845,115, entitled "TRAFFIC RADAR SYSTEM WITH PATROL VEHICLE SPEED DETECTION", filed Jun. 21, 2022, which claims priority benefit, with regard to all common subject matter, to a continuation-in-part patent application with U.S. patent application Ser. No. 17/196,313, entitled "TRAFFIC RADAR SYSTEM WITH PATROL VEHICLE SPEED DETECTION", filed Mar. 9, 2021, which claims priority benefit, with regard to all common subject matter, to a regular utility patent application with U.S. patent application Ser. No. 16/137,860, entitled "TRAFFIC RADAR SYSTEM WITH PATROL VEHICLE SPEED DETECTION", filed Sep. 21, 2018, which claims priority benefit to U.S. Provisional Application No. 62/569,667, entitled "TRAFFIC RADAR SYSTEM WITH MULTIPLE ZONE TARGET DETECTION", and filed Oct. 9, 2017; U.S. Provisional Application No. 62/569,923, entitled "GPS ASSISTED PATROL SPEED SEARCH FOR DSP TRAFFIC RADAR", and filed Oct. 9, 2017; and U.S. Provisional Application No. 62/570,446, entitled "TRAFFIC RADAR SYSTEM WITH ELECTRONIC TUNING FORK TEST FEATURE", and filed Oct. 10, 2017. The earlier-filed applications are hereby incorporated by reference in their entireties into the current application.

BACKGROUND OF THE INVENTION

Embodiments of the current invention relate to radar systems that include patrol vehicle speed detectors to help determine target vehicle speeds.

DESCRIPTION OF THE RELATED ART

Traffic radio and ranging (radar) systems that are implemented in law enforcement patrol vehicles typically include at least one radar transceiver that transmits a radar beam and receives reflections of the radar beam as it bounces off of target vehicles in a zone. The received reflections of the radar beam are converted to an electronic signal which is processed to determine the speeds of the target vehicles, which may then be displayed on a display. When using various techniques to determine target vehicle speeds, it is necessary to know the speed of the patrol vehicle. Prior art traffic radar systems have accessed the patrol vehicle speed from the patrol vehicle itself. But, connecting the traffic radar system to the patrol vehicle's speed detection electronics may be difficult and time consuming. Furthermore, each patrol vehicle make and/or model may use a different protocol to output the patrol vehicle's speed, thereby requiring multiple software or firmware interfaces for the traffic radar system to properly receive the patrol vehicle speed from different vehicles.

SUMMARY OF THE INVENTION

Embodiments of the current invention solve the above-mentioned problems and provide a distinct advance in the art of traffic radar systems. An exemplary traffic radar system includes a patrol vehicle speed detector that is independent from the patrol vehicle and thus requires no connection to the patrol vehicle and no specific vehicle software or firmware interface.

The traffic radar system comprises a first radar transceiver, a second radar transceiver, a speed determining element, and a processing element. The first radar transceiver is configured to transmit and receive radar beams from a front zone corresponding to area in front of a patrol vehicle. The first radar transceiver is further configured to generate a first electronic signal corresponding to the received radar beam. The second radar transceiver is configured to transmit and receive radar beams from a rear zone corresponding to area behind the patrol vehicle. The second radar transceiver is further configured to generate a second electronic signal corresponding to the received radar beam. The speed determining element is configured to determine and output a speed of the patrol vehicle. The processing element is configured to receive a plurality of digital data samples derived from the first or second electronic signals, receive the speed of the patrol vehicle, process the digital data samples to determine a relative speed of at least one target vehicle in the front zone or the rear zone, and convert the relative speed of the target vehicle to an absolute speed using the speed of the patrol vehicle.

Another embodiment of the invention provides a traffic radar system comprising a first radar transceiver, a second radar transceiver, a speed determining element, and a processing element. The first radar transceiver is configured to transmit and receive radar beams from a front zone corresponding to area in front of a patrol vehicle. The first radar transceiver is further configured to generate a first electronic signal corresponding to the received radar beam. The second radar transceiver is configured to transmit and receive radar beams from a rear zone corresponding to area behind the patrol vehicle. The second radar transceiver is further configured to generate a second electronic signal corresponding to the received radar beam. The speed determining element is configured to receive and process radio frequency signals from a global navigation satellite system to determine and output a speed of the patrol vehicle. The processing element is configured to receive a plurality of digital data samples derived from the first or second electronic signals, receive the speed of the patrol vehicle, perform a time domain to frequency domain conversion on the digital data samples creating a plurality of frequency bins, each frequency bin associated with a bin number, having a relative magnitude value, and corresponding to a speed of a vehicle, identify a range of frequency bin numbers that correspond to the speed of the patrol vehicle and form a patrol vehicle speed window, determine at least one group of successive frequency bin numbers outside of the patrol vehicle speed window whose relative magnitude is greater than a spike threshold value, convert one frequency bin number in each group to the relative speed of one target vehicle, and convert the relative speed of the target vehicle to an absolute speed using the speed of the patrol vehicle.

Yet another embodiment of the invention provides a computer-implemented method for determining speeds of target vehicles using a traffic radar system. The method comprises receiving a speed of a patrol vehicle from a speed determining element; receiving a plurality of digital data samples derived from radar transceiver signals; processing the digital data samples to determine a relative speed of at least one target vehicle in a front zone relative to the patrol vehicle or the rear zone relative to the patrol vehicle; and converting the relative speed of the target vehicle to an absolute speed using the speed of the patrol vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein:

FIG. 5 is an example of a satellite data message output by a speed determining element;

FIG. 6 is a table explaining a format of the satellite data message;

FIG. 12 is an example of a data packet output by a global navigation satellite system module;

FIG. 13 is a table explaining a format of the data packet; and

Figure 1:
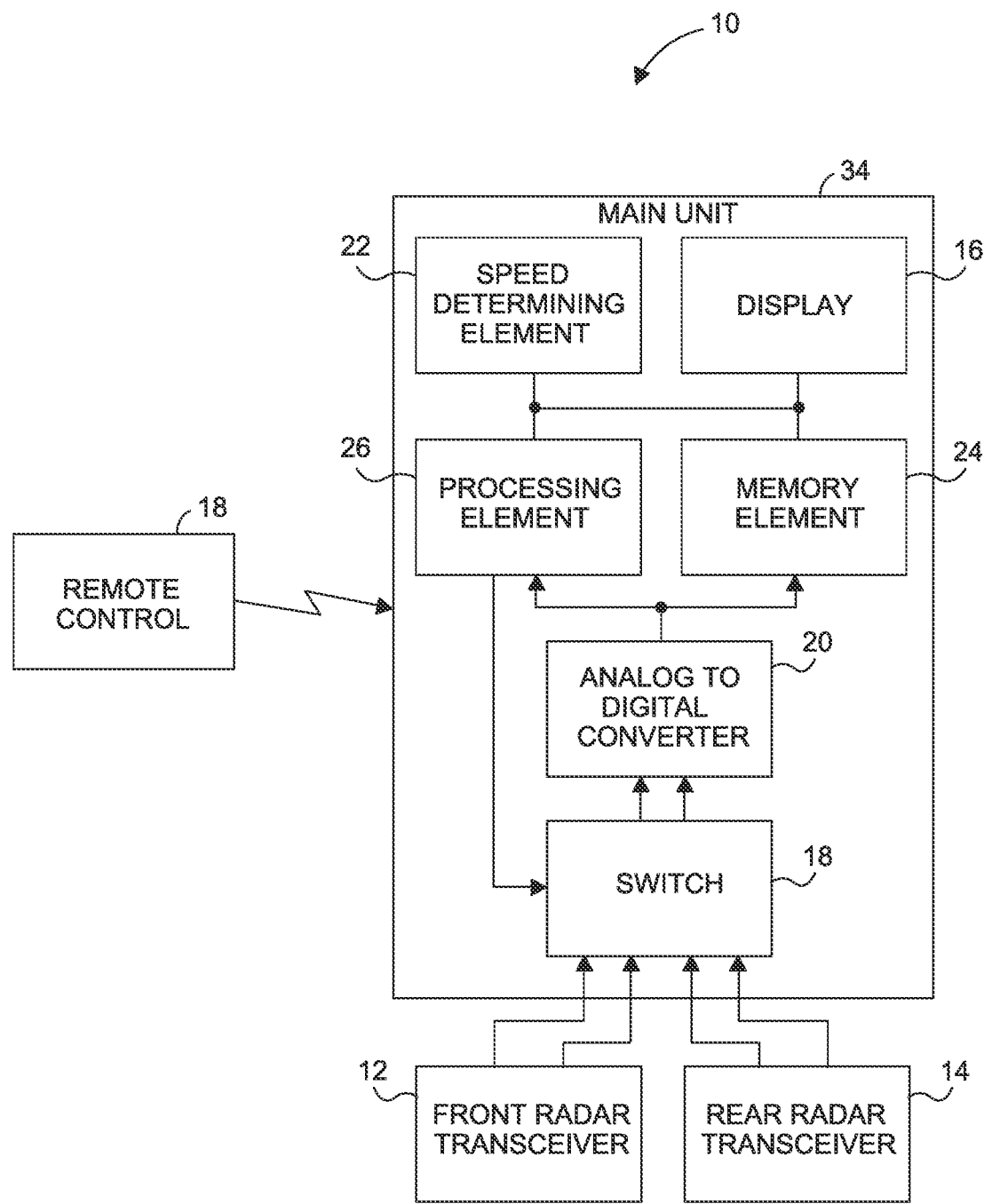
FIG. 1 is a schematic block diagram illustrating electronic components of a traffic radar system, constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 2:
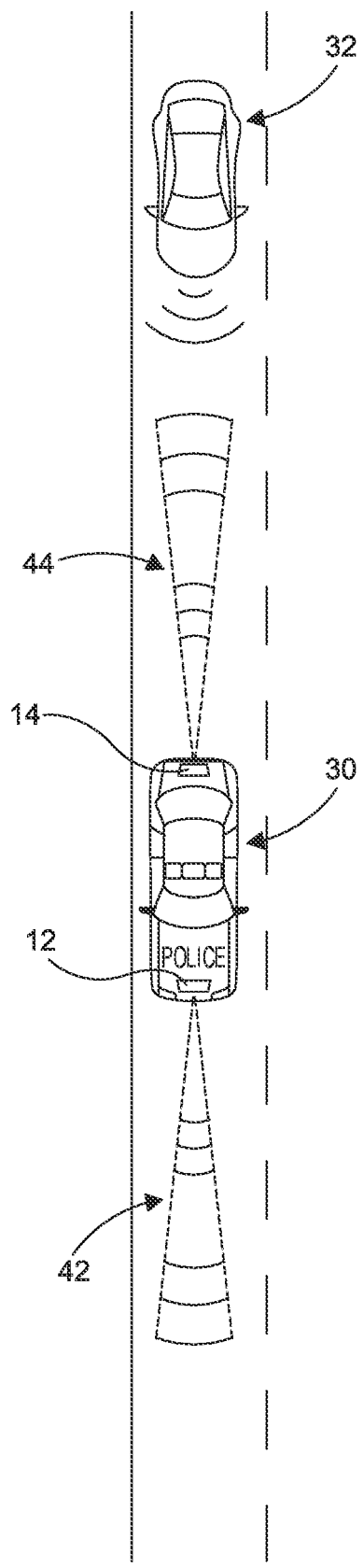
FIG. 2 is an environmental top view of a law enforcement patrol vehicle and a target vehicle, the law enforcement patrol vehicle is equipped with the traffic radar system which includes a front radar transceiver generating a first radar beam and a rear radar transceiver generating a second radar beam.

Referring to FIGS. 1 and 2, a traffic radar system 10, constructed in accordance with various embodiments of the current invention, broadly comprises a front radar transceiver 12, a rear radar transceiver 14, a display 16, a switch 18, an analog-to-digital converter (ADC) 20, a speed determining element 22, a memory element 24, a processing element 26, and a remote control 28. The traffic radar system 10 is typically installed in or on a law enforcement patrol vehicle 30 and is utilized to monitor the speeds of (target) vehicles 32 on a roadway.

The display 16, the switch 18, the ADC 20, the speed determining element 22, the memory element 24, and the processing element 26 generally form a main unit 34. The main unit 34 may include additional components not shown in the figures and not discussed in greater detail. The additional components may include a housing to retain the electronic circuits, a communication element to provide wired or wireless communication with other devices, a user interface to allow users to operate the system 10, and so forth. The housing may also include a mount or hardware to mount the main unit 34 in or on the vehicle dashboard or center console.

Figure 3:
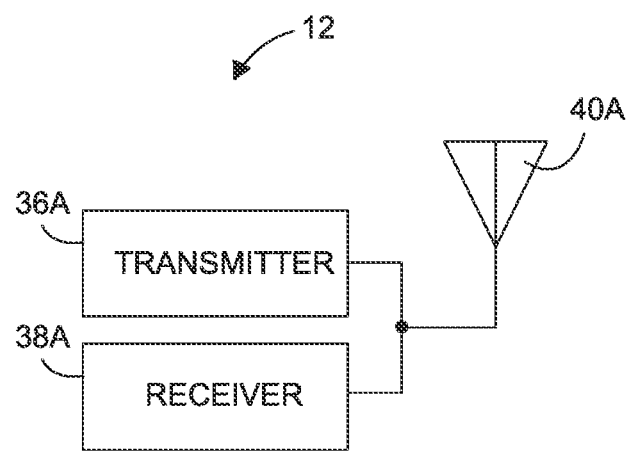
FIG. 3 is a schematic block diagram illustrating electronic components of the front radar transceiver assembly.

The front radar transceiver 12 generally transmits and receives radio frequency (RF) electromagnetic radiation for a radio detection and ranging (radar) application. The front radar transceiver 12 may include a transmitter 36A, a receiver 38A, and an antenna 40A, as shown in FIG. 3. The transmitter 36A may include electronic signal transmitting circuits, such as oscillators, mixers, frequency multipliers, filters, amplifiers, impedance matchers, and the like. The transmitter 36A generates a first RF electronic signal with an exemplary frequency of approximately 35.5 gigahertz (GHz), which is in the Ka band of radar frequency band classification. The transmitter 36A may receive a signal or data input that triggers it to generates the first RF electronic signal. Or, the transmitter 36A may generate the first RF electronic signal on a regular, periodic basis.

The receiver 38A may include electronic signal receiving circuits, such as oscillators, mixers, matched filters, amplifiers, and the like. The receiver 38A may receive a second RF electronic signal that includes reflection data resulting from reflections of a radar beam off of objects in the vicinity of the front radar transceiver 12. The receiver 38A may generate a front radar output electronic signal that has a lower frequency and still includes the reflection data. In various embodiments, the front radar output electronic signal has a dual complex or quadrature (I/Q) format. The front radar output electronic signal is communicated to the main unit 34.

The antenna 40A generally transmits a first radar beam 42 and receives reflections of the radar beam 42 as it reflects from target vehicles 32. When the antenna 40A receives the first RF electronic signal from the transmitter 36A, it transmits the first radar beam 42, that is, radio wave electromagnetic radiation forming the radar beam having an exemplary frequency of approximately 35.5 GHz. When the antenna 40A receives reflections of the first radar beam 42, it generates the second RF electronic signal. The antenna 40A may be embodied by directional antennas such as a parabolic antennas. The antenna 40A may transmit the first radar beam 42 as shown in FIG. 2, wherein the first radar beam 42 may have a width of approximately 12 degrees. The front radar transceiver 12 may be mounted or installed on the forward portion of the patrol vehicle, such as a hood, a grill, or a front bumper of the vehicle. Thus, the first radar beam 42 is transmitted in front of the patrol vehicle, also known as the "front zone".

Figure 4:
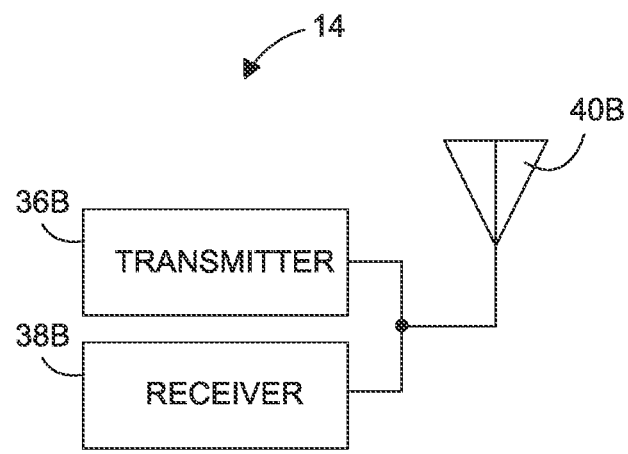
FIG. 4 is a schematic block diagram illustrating electronic components of the rear radar transceiver assembly.

Referring to FIG. 4, the rear radar transceiver 14 includes a transmitter 36B, a receiver 38B, and an antenna 40B, each of which is substantially identical in structure and function to the like-named components described above for the front radar transceiver 12. The antenna 40B may transmit a second radar beam 44 as shown in FIG. 2, wherein the second radar beam 44 may also have a width of approximately 12 degrees. The receiver 38B may generate a rear radar output electronic signal that varies according to reflections of the second radar beam 44 received by the antenna 40B. In various embodiments, the rear radar output electronic signal has a dual complex or quadrature (I/Q) format. The rear radar output electronic signal is communicated to the main unit 34. The rear radar transceiver 14 may be mounted or installed on the rear portion of the patrol vehicle, such as a trunk cover or a rear bumper of the vehicle. Thus, the second radar beam 44 is transmitted in the rear of the patrol vehicle, also known as the "rear zone".

The display 16 may include video devices of the following types: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, plasma, heads-up displays (HUDs), or the like, or combinations thereof. The display 16 may include a screen on which the information is presented, with the screen possessing a square or a rectangular aspect ratio that may be viewed in either a landscape or a portrait mode. In various embodiments, the display 16 may also include a touch screen occupying the entire screen or a portion thereof so that the display 16 functions as part of a user interface. The touch screen may allow the user to interact with the main unit 34 by physically touching, swiping, or gesturing on areas of the screen.

The switch 18 may have a double pole, double throw (DPDT) configuration with a first pair of input contacts, a second pair of input contacts, and a pair of output contacts. The first input contacts are electrically connected to the front radar transceiver 12 and receive the front radar output electronic signal. The second input contacts are electrically connected to the rear radar transceiver 14 and receive the rear radar output electronic signal. The output contacts may be electrically connected to the ADC 20. The switch 18 may operate in one of two modes. In a first mode, the output contacts receive the front radar output electronic signal. In a second mode, the output contacts receive the rear radar output electronic signal. Selection of the mode is controlled by a switch control signal from the processing element 26.

The ADC 20 receives the front radar output electronic signal or the rear radar output electronic signal from the switch 18. The ADC 20 includes electronic circuitry that converts the analog electrical characteristics of the front radar output electronic signal or the rear radar output electronic signal to a corresponding stream of sampled digital data, which includes a plurality of samples, each sample representing a value of the signal. The ADC 20 communicates the sampled digital data stream of the front radar output electronic signal or the rear radar output electronic signal to the memory element 24, the processing element 26, or both.

The speed determining element 22 generally determines a speed of the main unit 34 and by extension, the patrol vehicle 30. The speed determining element 22 may receive and process radio frequency (RF) signals from a multi-constellation global navigation satellite system (GNSS) such as the global positioning system (GPS), the GLONASS system, the Galileo system, the quasi-zenith satellite system (QZSS), and so forth. The speed determining element 22 may also may receive and process RF signals from telecommunications networks that provide or utilize Assisted GPS (A-GPS). The speed determining element 22 may accompany or include an antenna to assist in receiving the satellite signals. The antenna may be a patch antenna, a linear antenna, or any other type of antenna that can be used with location or navigation devices. The speed determining element 22 may include satellite navigation receivers, processors, controllers, other computing devices, or combinations thereof, and memory. An exemplary speed determining element 22 is embodied by the SE868K3-A GNSS module from Telit Wireless Solutions of London, England UK. The speed determining element 22 may determine or receive positioning or geolocation information from GNSS constellations at regular intervals over time and thus is operable to determine speed, or speed over ground, as well as heading, or course over ground. The speed determining element 22 communicates the patrol vehicle speed to the processing element 26, the memory element 24, or both. The patrol vehicle speed, along with other data, is output in a satellite data message at regular intervals from the speed determining element 22.

The memory element 24 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element 24 may include, or may constitute, a "computer-readable medium". The memory element 24 may store the instructions, code, code statements, code segments, software, firmware, programs, applications, apps, services, daemons, or the like that are executed by the processing element 26. The memory element 24 may also store data that is received by the processing element 26 or the device in which the processing element 26 is implemented. The processing element 26 may further store data or intermediate results generated during processing, calculations, and/or computations as well as data or final results after processing, calculations, and/or computations. In addition, the memory element 24 may store settings, data, documents, sound files, photographs, movies, images, databases, and the like.

The processing element 26 may comprise one or more processors. The processing element 26 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, code statements, software, firmware, programs, applications, apps, processes, services, daemons, or the like. The processing element 26 may also include hardware components such as registers, finite-state machines, sequential and combinational logic, and other electronic circuits that can perform the functions necessary for the operation of the current invention. In certain embodiments, the processing element 26 may include multiple computational components and functional blocks that are packaged separately but function as a single unit. The processing element 26 may be in electronic communication with the other electronic components through serial or parallel links that include universal busses, address busses, data busses, control lines, and the like. The processing element 26 may be operable, configured, or programmed to perform the following functions by utilizing hardware, software, firmware, or combinations thereof.

Before normal operation begins, the processing element 26 may execute an initialization process by first initializing its own input/output ports. Then, the processing element 26 initializes the speed determining element 22 by sending a series of command messages to the speed determining element 22 to set the format of output from the speed determining element 22 and improve its performance. The processing element 26 communicates a first command to the speed determining element 22 that sets a format of its satellite data message to an RMC message, or Recommended Minimum Specific GNSS data. This reduces the amount of data included in each satellite data message from the speed determining element 22. The processing element 26 communicates a second command to the speed determining element 22 that decreases the time period between position fixes, which is when the speed determining element 22 determines its position, speed, and other data that is included in the satellite data message. The second command has the effect of increasing the number of satellite data messages that the speed determining element 22 can produce per second. An example of the second command sets the time period to 200 milliseconds, thereby setting the satellite data message rate to 5 times per second. The processing element 26 communicates a third command to the speed determining element 22 that increases the bit communication rate output by the speed determining element 22. Thus, each time the speed determining element 22 outputs the satellite data message, it generates the message more quickly. Other command messages may be sent to the speed determining element 22 to further customize the data output.

An example of the RMC-format satellite data message that is output from the speed determining element 22 is shown in FIG. 5. An explanation of the contents of the satellite data message is shown in the table of FIG. 6. The table includes three columns: a first column that lists a plurality of fields that are included in each message, a second column that lists an example of each field, and a third column that lists a description of each field or optional values that could be included in each field. One of the fields in the satellite data message is "Speed Over Ground", which is the speed of the patrol vehicle 30 around the time that the satellite data message is generated.

Once the speed determining element 22 has been properly initialized, it communicates the satellite data message, with the format shown in FIG. 5, to the processing element 26 and/or the memory element 24 at a rate of 5 messages per second. The processing element 26 receives the satellite data message and parses it to retrieve the value of the Speed Over Ground field, which is the patrol vehicle speed. Since the Speed Over Ground is recorded by the speed determining element 22 in units of knots, the processing element 26 converts the value to units of miles per hour (mph) and kilometers per hour (km/h or kph). Based on the value of the patrol vehicle speed, the processing element 26 sets a mode of speed detection to either "stationary", if the patrol vehicle speed is less than a first threshold speed for at least four consecutive satellite data messages, or "moving", if the patrol vehicle speed is greater than a second threshold speed for at least four consecutive satellite data messages. An exemplary first threshold speed is 1.1 mph. An exemplary second threshold speed is 3.1 mph.

The main unit 34 operates in one of three modes—a front zone mode, a rear zone mode, and a scan mode. The mode is selected by a user, typically a law enforcement officer, who selects the mode from the user interface of the main unit 34. In the front zone mode, the processing element 26 outputs the switch control signal at a first level to set the switch 18 in the first mode such that the processing element 26 and the memory element 24 receive a plurality of front radar digital data samples from the ADC 20. In the rear zone mode, the processing element 26 outputs the switch control signal at a second level to set the switch 18 in the second mode such that the processing element 26 and the memory element 24 receive a plurality of rear radar digital data samples from the ADC 20. In the scan mode, the processing element 26 outputs the switch control signal at the first level to set the switch 18 in the first mode for a first period of time and then outputs the switch control signal at the second level to set the switch 18 in the second mode for a second period of time such that the processing element 26 and the memory element 24 receive the front radar digital data samples for the first period of time and the rear radar digital data samples for the second period of time. The processing element 26 then toggles the level of the switch control signal between the first level and the second level in order to toggle the mode of the switch 18 between the first mode and the second mode. Thus, the processing element 26 and the memory element 24 repeatedly receive the front radar digital data samples for the first period of time and the rear radar digital data samples for the second period of time. Typically, the first period of time is the amount of time necessary for the processing element 26 and the memory element 24 to receive a certain, predetermined number of front radar digital data samples, while the second period of time is the amount of time necessary for the processing element 26 and the memory element 24 to receive a certain, predetermined number of rear radar digital data samples.

Figure 7:
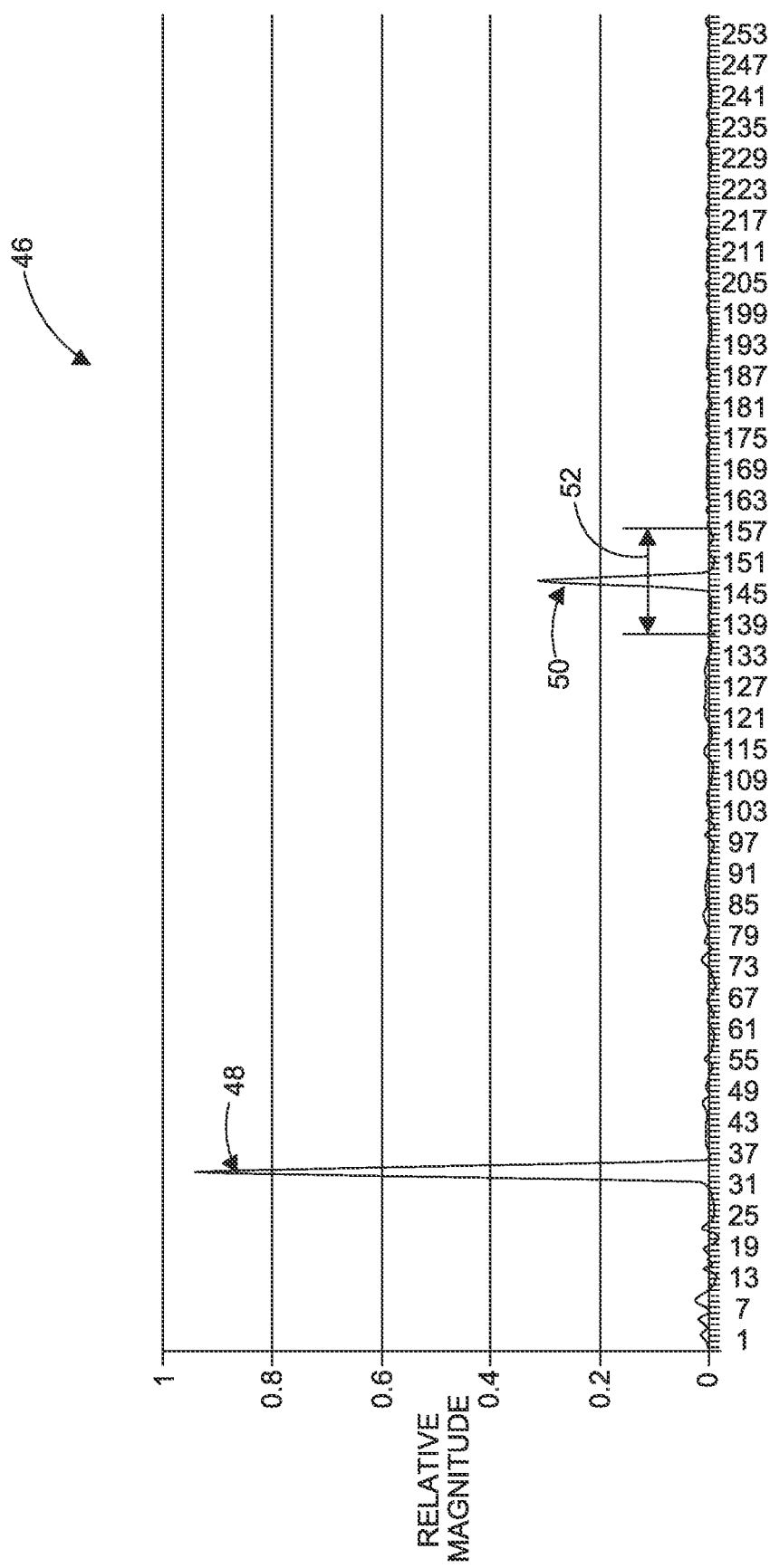
FIG. 7 is a plot of relative magnitude vs. frequency resulting from a fast Fourier transform calculation performed on data from the front radar transceiver and the rear radar transceiver.

Whether the main unit 34 is in the front zone mode, the rear zone mode, or the scan mode, once the processing element 26 and the memory element 24 receive the predetermined number of front radar digital data samples or rear radar digital data samples, the processing element 26 performs a time domain to frequency domain conversion on the time-domain-based front or rear radar digital data samples. The processing element 26 may utilize a discrete Fourier transform (DFT), a fast Fourier transform (FFT), or the like. Exemplary embodiments utilize the FFT. Thus, the predetermined number of front or rear radar digital data samples is an amount of samples necessary for the processing element 26 to perform an M-point FFT, where M is a 2n value, such as 256, 512, 1024, etc. The FFT calculation produces a plurality of frequency bins, each frequency bin associated with a bin number and having a relative magnitude value. In addition, each frequency bin may correspond, or relate, to a speed of a vehicle. A plot 46 of the result of a random FFT calculation, i.e., relative magnitude vs. frequency bin, is shown in FIG. 7. Generally, the reflection of the radar beam off of each target vehicle 32 produces a spike 48 in the relative magnitude for a small number of adjacent frequency bins in the plot 46—the spike 48 being values of the relative magnitude greater than a predetermined spike threshold. The processing element 26 may examine the relative magnitude associated with each frequency bin number and compare the relative magnitude with the spike threshold. If the relative magnitude is above the spike threshold for a group (e.g., four or five) of successive bin numbers, then the processing element 26 determines that the frequency bin numbers include a spike 48. The location of the spike 48, i.e., the numbers of the frequency bins with the relative magnitude above the spike threshold, corresponds to, or varies according to, the relative speed of the target vehicle 32.

In addition, the reflection of the radar beam off surrounding terrain relative to the patrol vehicle 30 produces a spike 50 in the plot 46. This must be accounted for when analyzing the relative magnitude data to determine the speeds of target vehicles 32. The processing element 26 converts the Speed Over Ground speed value of the patrol vehicle 30 (from the speed determining element 22) to a frequency bin number. The processing element 26 may also create a patrol vehicle speed window 52, which includes the bin numbers that correspond to the converted patrol vehicle speed frequency bin number plus 5 mph and minus 5 mph. The processing element 26 identifies the patrol vehicle spike 50 by determining which spike lies within the patrol vehicle speed window 52. Hence, the processing element 26 determines that the other spikes 48 outside of the patrol vehicle speed window 52 belong to target vehicles 32. In the exemplary plot 46 of FIG. 7, there is a first spike that is a target vehicle spike 48 and a second spike that is a patrol vehicle spike 50 and exists within the patrol vehicle speed window 52.

The processing element 26 converts the frequency bin numbers for each spike 48 to a target vehicle speed in units of miles per hour or kilometers per hour. In various embodiments, the processing element 26 may convert the frequency bin number with the greatest relative magnitude to a target vehicle speed for each spike 48. If the patrol vehicle 30 is in stationary mode, then the target vehicle speed, that was just converted, is an absolute, or actual, target vehicle speed. If the patrol vehicle 30 is in moving mode, then the target vehicle speed is a speed relative to the speed of the patrol vehicle 30. The absolute target vehicle speed is determined by further mathematical operations, such as adding the target vehicle speed to the patrol vehicle speed, subtracting the target vehicle speed from the patrol vehicle speed, or subtracting the patrol vehicle speed from the target vehicle speed. The choice of mathematical operation may depend on whether the target vehicle 32 and the patrol vehicle 30 are traveling the same direction or the opposite directions or whether the patrol vehicle 30 is traveling faster or slower than the target vehicle 32, or alternatively, whether the target vehicle 32 is getting closer to, or moving away from, the patrol vehicle 30. The processing element 26 may analyze phase data produced by the FFT calculation, not shown in the figures, in order to determine which mathematical operation to perform in order to determine the absolute speed of the target vehicles 32. After analyzing the phase data, the processing element 26 determines the absolute target vehicle speed for each spike 48 in the relative magnitude data.

Figures 8, 9:
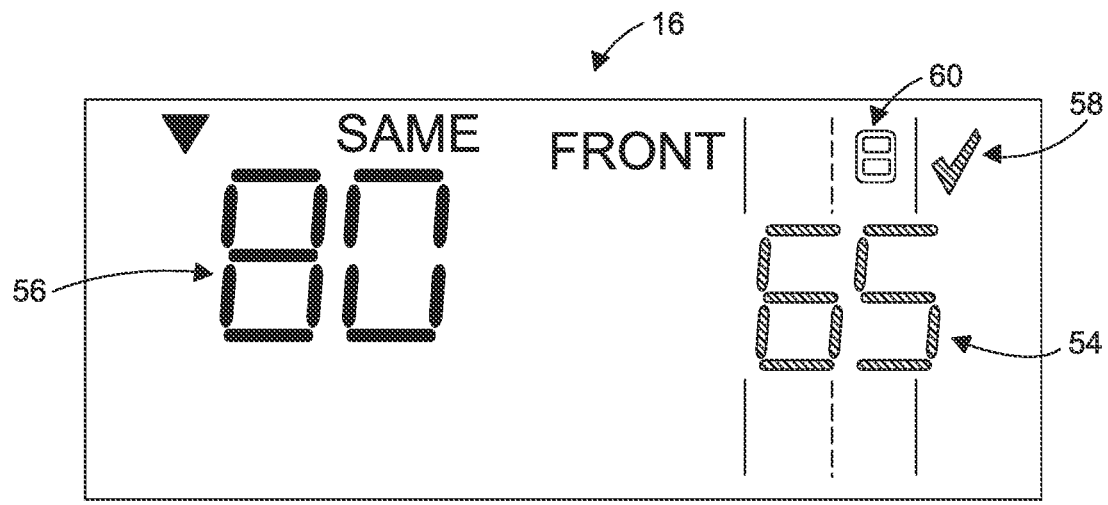
FIG. 8 is a front view of at least a portion of a display of a main unit of the traffic radar system.
FIG. 9 is a table explaining a format of a data packet that is stored in non-volatile memory during a data logging event.

When the absolute speed of all of the target vehicles 32 has been determined, the processing element 26 controls the display to display the speeds. Typically, the target vehicle speed with the greatest magnitude (the strongest speed) is displayed along with the patrol vehicle speed. An example of at least a portion of the display 16 of the main unit 34 is shown in FIG. 8. The display 16 includes a patrol vehicle speed indication 54 and a target vehicle speed indication 56. The display 16 also includes a verification indicia 58, in this case a check mark, that indicates the speed displayed in the patrol vehicle speed indication 54 is verified by the speed determining element 22, which is independent from the speed of the patrol vehicle 30 provided by the patrol vehicle 30 radar Doppler return. The display 16 may further include a first label "FRONT" indicating the target vehicle 32 whose speed is displayed in the target vehicle speed indication 56 is in the front zone. The display may also include a second label "REAR", not shown in the figures, which indicates that the target vehicle 32 whose speed is displayed in the target vehicle speed indication 56 is in the rear zone. In addition, the display 16 may include a target vehicle icon 60 whose position, relative to the patrol vehicle speed indication 54, indicates the position of the target vehicle 32 relative to the patrol vehicle 30. For example, the target vehicle icon 60 being positioned above the patrol vehicle speed indication 54 indicates that the target vehicle 32 is in the front zone. The target vehicle icon 60 being positioned below the patrol vehicle speed indication 54 indicates that the target vehicle 32 is in the rear zone.

The processing element 26 may complete the target vehicle speed determination process multiple times per second, wherein the process includes: receiving the Speed Over Ground of the patrol vehicle 30 from the speed determining element 22, converting the speed to units of miles per hour, receiving front or rear radar digital data samples, converting the radar digital data samples to frequency domain data, determining the patrol vehicle speed window 52, determining frequency bin spikes 48 that are located outside the patrol vehicle speed window 52, converting the frequency bin spikes 48 to target vehicle speeds, and controlling the display 16 to display the target vehicle speeds.

The processing element 26 receives input from the user interface of the main unit 34. The operator (typically a law enforcement officer) may lock the speed readings, for example when the processing element 26 has determined a target vehicle speed that is over the speed limit. Locking the speed readings captures and stores the current target and patrol speed readings to prevent potentially losing the speed values that indicated the target speed was exceeding the speed limit as the target speeds update during normal operation. The processing element 26 then performs an event data storage. The event data storage may be performed in other circumstances as well, such as running a system test, an occurrence of a system error, updating of the system firmware, and so forth. The event data storage may include storing a data packet in non-volatile memory in the memory element 24 or transmitting the data packet to an external device, system, server, or the like. An example of the data packet is shown in FIG. 9 and may include a plurality of data fields. A first field is a record number which is unique for each data packet. A second field is a record type which identifies the type of event that caused the data packet to be created. In the example, the record type is "locked speeds event". A third field is a universal time when the data packet was created. A fourth field is a date when the data packet was created. A fifth field is a geolocation of the patrol vehicle 30 when the data packet was created. The geolocation may be stored in units of latitude and longitude and may be derived from the satellite data message generated by the speed determining element 22. A sixth field is a course, or heading, of the patrol vehicle 30 when the data packet was created.

The course may also be derived from the satellite data message generated by the speed determining element 22. A seventh field is a patrol vehicle speed which is determined as described above. An eighth field is a target vehicle speed which is also determined as described above. A ninth field is an operating mode describing the mode of speed detection and direction of travel of the target vehicle 32 relative to the patrol vehicle 30. In the example, the mode is "moving same direction".

The remote control 28 generally provides control of the operation of the traffic radar system 10. The remote control 28 may be packaged in a hand held package, may be mounted on the steering wheel or center console of the patrol vehicle 30, or may be implemented as a software application running on a mobile electronic device, such as a smart phone, a tablet computer, or the like. The remote control 28 may communicate with the main unit 34 through a wired cable connection or wirelessly through infrared (IR) signaling or radio frequency (RF) signaling, such as Bluetooth™, cellular, WiFi, etc. The remote control 28 may include a keypad-type interface which allows the operator to set the operating mode and other functions of the traffic radar system 10.

Figure 10A:
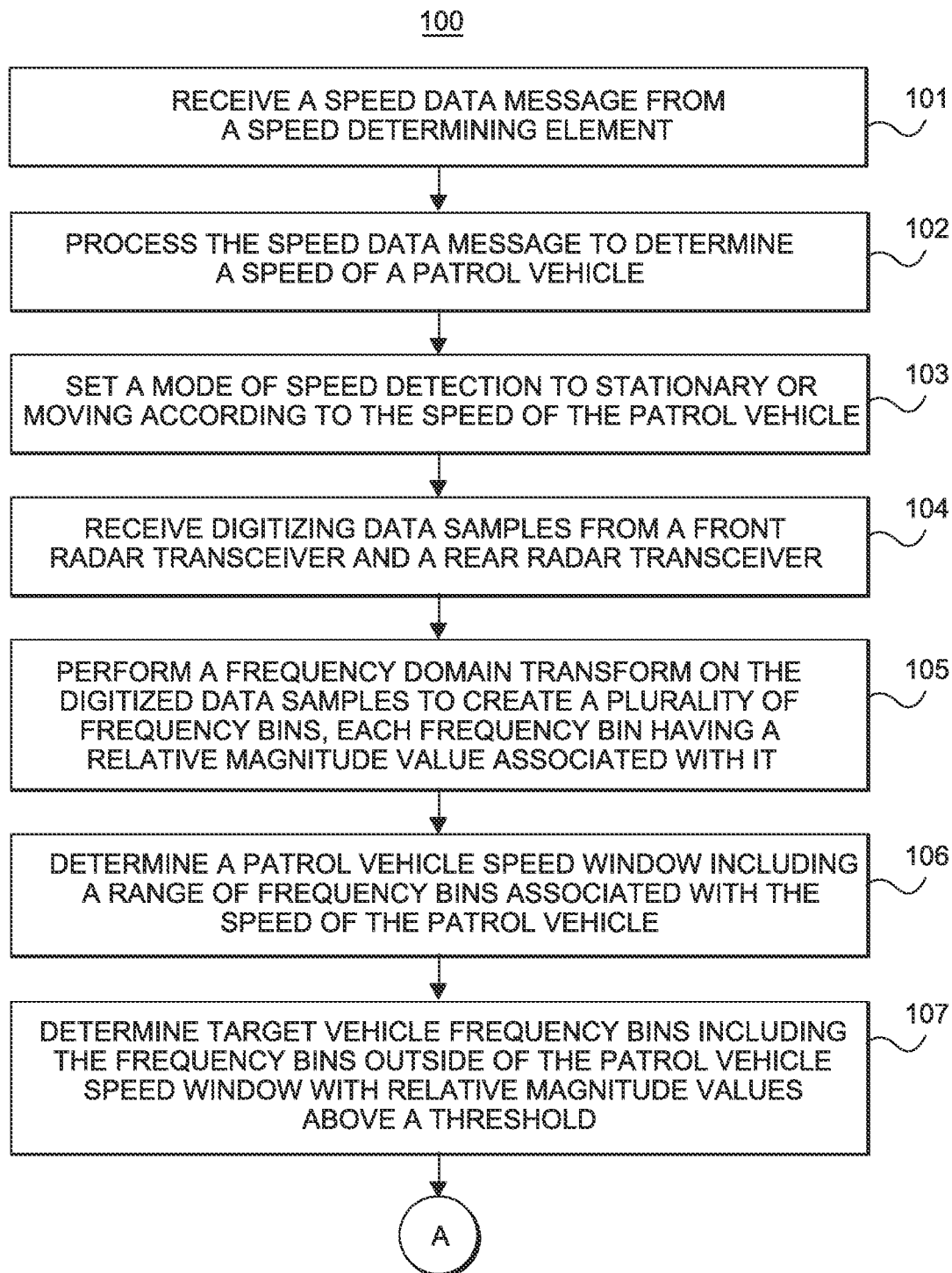
FIGS. 10A and 10B include a listing of at least a portion of the steps of a computer-implemented method for determining speeds of target vehicles.
Figure 10B:
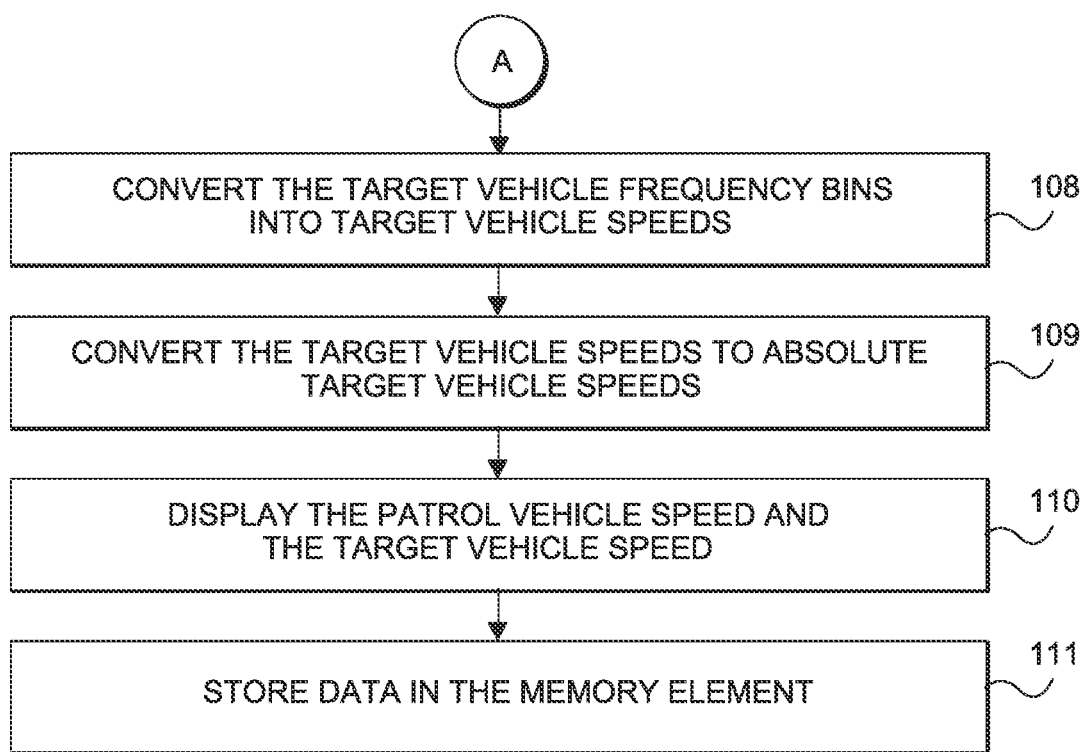

FIGS. 10A and 10B depicts a listing of at least a portion of the steps of an exemplary computer-implemented method 100 for determining speeds of target vehicles 32 using a traffic radar system 10. The steps may be performed in the order shown in FIGS. 10A and 10B, or they may be performed in a different order. Furthermore, some steps may be performed concurrently as opposed to sequentially. In addition, some steps may be optional or may not be performed. In various embodiments, the steps are performed by the processing element 26 of the main unit 34.

Referring to step 101, a satellite data message is received from the speed determining element 22. An example of the satellite data message is shown in FIG. 5. And an explanation of the contents of the satellite data message is shown in the table of FIG. 6.

Referring to step 102, the satellite data message is processed to determine a speed of the patrol vehicle 30. The satellite data message is parsed to find a Speed Over Ground field, and the value of the field is retrieved. The Speed Over Ground value may be in units of knots. The Speed Over Ground value is converted to units of miles per hour (mph) and kilometers per hour (km/h or kph) and set as the patrol vehicle speed.

Referring to step 103, a mode of speed detection is set according to the patrol vehicle speed. Based on the value of the patrol vehicle speed, the mode of speed detection is set to either "stationary", if the patrol vehicle speed is less than 1.1 mph for at least four consecutive satellite data messages, or "moving", if the patrol vehicle speed is greater than 3.1 mph for at least four consecutive satellite data messages.

Referring to step 104, digitized data samples from the front radar transceiver 12 and the rear radar transceiver 14 are received. The ADC 20 digitizes the front radar output electronic signal to generate the front radar digital data samples and the rear radar output electronic signal to generate the rear radar digital data samples. The digital data samples may be received by the processing element 26 and stored in the memory element 24. Depending on the operating mode of the main unit 34 (front zone mode, rear zone mode, or scan mode), a continuous stream of front radar digital data samples is received, a continuous stream of rear radar digital data samples is received, or alternating streams of front radar digital data samples and rear radar digital data samples are received.

Referring to step 105, a time domain to frequency domain conversion of the digital data samples is performed. The digital data samples are time-domain data. An exemplary conversion utilizes the FFT. Once enough digital data samples to perform an M-point FFT, where M is a 2n value, such as 256, 512, 1024, etc. have been received, the FFT is performed. The FFT calculation produces a plurality of frequency bins, each frequency bin being numbered and having a relative magnitude value. A plot 46 of the result of a random FFT calculation, i.e., relative magnitude vs. frequency bin, is shown in FIG. 7. Generally, the reflection of the radar beam off of each target vehicle 32 produces a spike 48 in the relative magnitude for a small number of adjacent frequency bin in the plot 46—the spike 48 being values of the relative magnitude greater than a predetermined spike threshold. The relative magnitude associated with each frequency bin number is compared with the spike threshold. If the relative magnitude is above the spike threshold for a predetermined quantity (e.g., four or five) of bin numbers in a row, then it is determined that the frequency bin numbers include a spike 48. The location of the spike 48, i.e., the numbers of the frequency bins with the relative magnitude above the spike threshold, corresponds to, or varies according to, the speed of the target vehicle 32.

Referring to step 106, a patrol vehicle speed window 52 corresponding to the patrol vehicle speed is determined. The reflection of the radar beam off of the surrounding terrain produces a spike 50 in the plot 46. This must be accounted for when analyzing the relative frequency bin data to determine the speeds of target vehicles 32. The processing element 26 converts the Speed Over Ground speed value of the patrol vehicle 30 (from the speed determining element 22) to a frequency bin number. The patrol vehicle speed window 52, as shown in FIG. 7, includes bin numbers that correspond to the converted patrol vehicle speed frequency bin number plus 5 mph and minus 5 mph.

Referring to step 107, the frequency bins outside of the patrol vehicle speed window 52 with relative magnitudes above the spike threshold are determined. The frequency bins outside of the patrol vehicle speed window 52 may be scanned or examined in succession, with the relative magnitude of each frequency bin being compared to the spike threshold. The successive frequency bin numbers that are greater than the spike threshold are determined to be part of a spike 48 and are associated with the speed of a target vehicle 32.

Referring to step 108, the target vehicle frequency bins are converted into target vehicle speeds. The frequency bin numbers for each spike 48 are converted to a target vehicle speed in units of miles per hour or kilometers per hour. In various embodiments, the frequency bin number with the greatest relative magnitude for each spike 48 is converted to a target vehicle speed.

Referring to step 109, the target vehicle speeds are converted to absolute target vehicle speeds. If the patrol vehicle 30 is in stationary mode, then the target vehicle speed is an absolute, or actual, target vehicle speed. If the patrol vehicle 30 is in moving mode, then the target vehicle speed is a speed relative to the speed of the patrol vehicle 30. The absolute target vehicle speed is determined by further mathematical operations, such as adding the target vehicle speed to the patrol vehicle speed, subtracting the target vehicle speed from the patrol vehicle speed, or subtracting the patrol vehicle speed from the target vehicle speed. The choice of mathematical operation may depend on whether the target vehicle 32 and the patrol vehicle 30 are traveling the same direction or the opposite directions or whether the patrol vehicle 30 is traveling faster or slower than the target vehicle 32. Phase data produced by the FFT calculation, not shown in the figures, may be analyzed in order to determine which mathematical operation to perform in order to determine the absolute speed of the target vehicles 32. After analyzing the phase data, the absolute target vehicle speed is determined for each spike 48 in the relative magnitude data.

Referring to step 110, the target vehicle speed and the patrol vehicle speed are displayed. Typically, the target vehicle speed with the greatest magnitude (the strongest speed) is displayed. An example of at least a portion of the display 16 with the patrol vehicle speed indication 54 and the target vehicle speed indication 56 is shown in FIG. 8.

Referring to step 111, data is stored in the memory element 24. Event data storage may be performed when the speed readings on the display 16 are locked or in other circumstances as well, such as running a system test, an occurrence of a system error, updating of the system firmware, and so forth. The event data storage may include storing a data packet in non-volatile memory in the memory element 24 or transmitting the data packet to an external device, system, server, or the like. An example of the data packet is shown in FIG. 9 and may include the data fields therein.

The current invention also provides a law enforcement patrol vehicle speed sensor 200 that operates as a standalone device to determine and output the speed of a patrol vehicle 30. The speed sensor 200 may be utilized with traffic radar systems that require the speed of the patrol vehicle 30 as an input, but for various reasons the traffic radar system is not coupled to the traditional sources of patrol vehicle speed data. Many traffic radar systems require knowledge of the speed of the patrol vehicle 30 in order to determine the speed of other vehicles, i.e., target vehicles. Traditionally, traffic radar systems have received the patrol vehicle speed as an input from the internal data system of the patrol vehicle 30 itself. For example, the patrol vehicle 30 may include data networks, such as an OBDII data bus or a CAN data bus, to which the traffic radar system is electrically connected. However, the data networks may be difficult to access within the vehicle, may require special connectors, or may require special software interfaces, all of which complicate the simple task of receiving the patrol vehicle speed as an input to the traffic radar system. In addition, using third-party connectors or other products to couple the traffic radar system to the patrol vehicle data network may void the warranty of the patrol vehicle 30. The speed sensor 200 of the current invention outputs the speed of the patrol vehicle 30 in an analog format through a cable to interface with older traffic radar systems and in a digital format either through a cable or wirelessly to interface with newer traffic radar systems.

Figure 11:
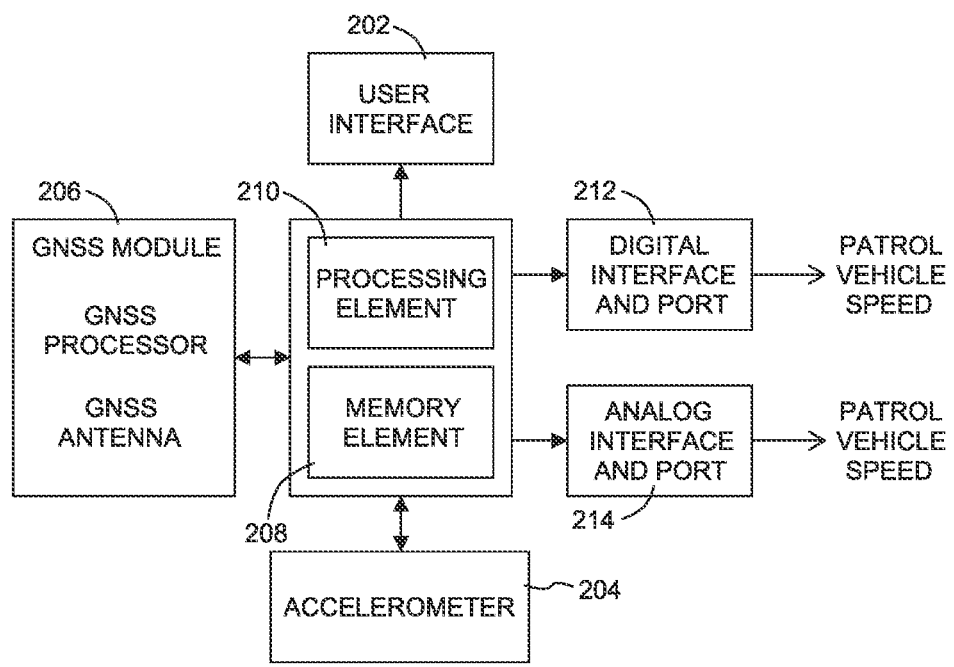
FIG. 11 is a schematic block diagram illustrating electronic components of a speed sensor for determining and outputting a speed of an associated patrol vehicle.

Referring to FIG. 11, the speed sensor 200 broadly comprises a user interface 202, an accelerometer 204, a global navigation satellite system (GNSS) module 206, a memory element 208, a processing element 210, a digital interface and port 212, and an analog interface and port 214.

The user interface 202 generally informs the user of the operational status of the speed sensor 200. The user interface 202 may include displays, speakers or other audio output devices, meters, or the like, or combinations thereof. Exemplary embodiments of the user interface include one or more light emitting diodes (LEDs) of various colors. The user interface 202 may indicate the status of the speed sensor 200 by having a first LED illuminate, either flashing or constant, in a first color to indicate normal operations, such as valid data from the GNSS module 206. The user interface 202 may have the first LED (or a second LED) illuminate, either flashing or constant, in a second color to indicate abnormal operations, such as invalid data from the GNSS module 206.

The accelerometer 204 generally senses or detects motion of the speed sensor 200 and by extension, the patrol vehicle 30. The accelerometer 204 may broadly include tilt sensors, inclinometers, gyroscopes, combinations thereof, or other devices including piezoelectric, piezoresistive, capacitive sensing, or micro electromechanical systems (MEMS) components. The accelerometer 204 may sense motion along one axis of motion or multiple axes of motion. Accelerometers 204 that sense motion along three orthogonal axes, such as X, Y, and Z, are often used. An exemplary accelerometer 204 includes an ADXL345 accelerometer from Analog Devices of Wilmington, MA. In various embodiments, the accelerometer 204 may measure the acceleration, such as acceleration due to the gravitation (G) force and body motion, of the patrol vehicle 30 and may output the measured data in a digital binary format. The accelerometer 204 outputs an acceleration electronic signal as an electric voltage and/or electric current level or sequence of digital data values whose level or value varies according to the measured acceleration of the patrol vehicle 30.

The GNSS module 206 generally receives wireless signals from which the speed of the speed sensor 200 and by extension, the speed of the patrol vehicle 30 is derived. The GNSS module may be similar in structure and function to the speed determining element 22. The GNSS module 206 includes a GNSS processor and a GNSS antenna. The GNSS processor may include receiving circuitry and signal processing circuitry configured to process radio frequency (RF) signals from a multi-constellation global navigation satellite system (GNSS) such as the global positioning system (GPS), the Galileo system, the GLONASS system, the quasi-zenith satellite system (QZSS), or the like. The antenna may be a patch antenna, a linear antenna, or any other type of antenna that can be used with location or navigation devices.

The GNSS module 206 may output data in a packet format, such as the packet shown in FIG. 12, wherein the packet includes a plurality of fields. The GNSS module 206 is configured by the processing element 210 to have a particular syntax for each field. An exemplary syntax of the fields of the data packet is shown in the table of FIG. 13. As indicated in the table, the GNSS module 206 is configured to process GPS format data and output a heading and speed for the speed sensor 200 and by extension, the patrol vehicle 30. In addition, one of the fields of the data packet indicates whether the heading and speed data are valid.

The memory element 208 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 208 may be embedded in, or packaged in the same package as, the processing element 210. The memory element 208 may include, or may constitute, a non-transitory "computer-readable medium". The memory element 208 may store the instructions, code, code statements, code segments, software, firmware, programs, applications, apps, services, daemons, or the like that are executed by the processing element 210. The memory element 208 may also store data that is received by the processing element 210 or the device in which the processing element 210 is implemented. The processing element 210 may further store data or intermediate results generated during processing, calculations, and/or computations as well as data or final results after processing, calculations, and/or computations. In addition, the memory element 208 may store settings, text data, documents from word processing software, spreadsheet software and other software applications, databases, and the like.

The processing element 210 may comprise one or more processors. The processing element 210 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 210 may generally execute, process, or run instructions, code, code segments, code statements, software, firmware, programs, applications, apps, processes, services, daemons, or the like. The processing element 210 may also include hardware components such as registers, finite-state machines, sequential and combinational logic, configurable logic blocks, and other electronic circuits that can perform the functions necessary for the operation of the current invention. In certain embodiments, the processing element 210 may include multiple computational components and functional blocks that are packaged separately but function as a single unit. In some embodiments, the processing element 210 may further include multiprocessor architectures, parallel processor architectures, processor clusters, and the like, which provide high performance computing. The processing element 210 may be in electronic communication with the other electronic components of the speed sensor 200 through serial or parallel links that include universal busses, address busses, data busses, control lines, and the like. The processing element 210 may be operable, configured, or programmed to perform the following functions by utilizing hardware, software, firmware, or combinations thereof.

Before normal operation begins, the processing element 210 may execute an initialization process by first initializing and/or configuring its own input/output ports. Then, the processing element 210 initializes and/or configures the GNSS module 206 by sending a series of command messages to the GNSS module 206 to set the format of the fields of the data packet, as illustrated in FIGS. 12 and 13. The processing element 210 may also configure the GNSS module 206 to output the data packet more frequently. In addition, the processing element 210 may initialize and/or configure the digital interface and port 212 and the analog interface and port 214.

Once the GNSS module 206 has been properly initialized and/or configured, it communicates the data packet, with the format shown in FIG. 12, to the processing element 210 and/or the memory element 208 at a rate of 5 packets per second. The processing element 210 receives the data packet and parses it to retrieve the value of the Speed Over Ground field, which is the patrol vehicle speed. The processing element 210 may convert the value to units of miles per hour (mph) and kilometers per hour (km/h or kph). The processing element 210 may store the speed value in the memory element 208. The processing element 210 also receives the acceleration electronic signal from the accelerometer 204 and may convert the information in the signal to acceleration units of mph per second or kph per second. The processing element 210 compares the speed value from the GNSS module 206 with the acceleration value from the accelerometer 204. The processing element 210 may perform a correlation calculation with the speed value and the acceleration value. Or, the processing element 210 may analyze the trend of the data for the speed and the acceleration. For example, an increase or a decrease in the speed from packet to packet should correspond to a nonzero value of the acceleration. And a constant speed from packet to packet should correspond to a value of roughly zero for the acceleration. If the correlation is positive or the speed and acceleration correspond to one another as described above, then the processing element 210 continues with operations as described below. If the correlation is not positive or the speed and acceleration do not correspond to one another as described above, then the processing element 210 may continue analyzing the speed and acceleration data for several more packets to determine whether the non-correlating data is anomalous and will correct itself. If the data does not correct, then the processing element 210 may communicate a signal or data to the user interface 202 to indicate that there is an error in the operation of the speed sensor 200. The speed sensor 200 may be evaluated for repair or replacement.

Occasionally, the data from the GNSS module 206 is invalid, which is a separate concern from the non-correlating data described above. The data may be invalid as a result of a failure to sync with the GNSS signal or other events. When this situation occurs, the GNSS module 206 outputs an "N" for "data not valid" in the Mode field of the data packet. The processing element 210 checks the Mode field in each data packet and if it has a value of "N", then the processing element 210 does not retrieve the Speed Over Ground value for the speed of the patrol vehicle 30. Instead, the processing element 210 calculates the speed of the patrol vehicle 30 from previously stored data. For example, the processing element 210 may calculate the patrol vehicle speed as: Current Speed=Previous Speed+(Acceleration×Time since Previous Speed). The processing element 210 may also communicate a signal or data to the user interface 202, such as changing the color of an LED, to indicate that the GNSS data was invalid. Usually, the GNSS data being invalid is a temporary situation.

The processing element 210 also monitors the Course Over Ground field of the data packet, which indicates the heading of the speed sensor 200 and by extension, the patrol vehicle 30. When the patrol vehicle 30 is stopped, the value of the Course Over Ground field may vary from packet to packet. But, as the patrol vehicle 30 starts to move, the value of the Course Over Ground field will be constant, at least while the patrol vehicle 30 is not turning. The constant value of the Course Over Ground field is a double check, along with nonzero values of the Speed Over Ground field, that the patrol vehicle 30 is moving and no longer stationary.

The processing element 210 communicates the speed value of the patrol vehicle 30, whether the speed value was derived from the Speed Over Ground data from the GNSS module 206 or calculated from a combination of the Speed Over Ground data and the accelerometer 204 data, to the digital interface and port 212 as a sequence of digital data values.

The processing element 210 also calculates a frequency, i.e., a patrol vehicle speed frequency, which varies according to the speed value of the patrol vehicle 30. The calculated frequency is used to set a frequency of a square wave electric voltage signal which is output from the analog interface and port 214. The square wave electric voltage signal may be the standard for outputting the patrol vehicle speed value to some older traffic radar systems. Some systems may interpret the speed of the patrol vehicle 30 as the square wave frequency divided by a frequency multiplier. Thus, the processing element 210 may calculate the square wave frequency as the speed value multiplied by the frequency multiplier. In exemplary embodiments, the frequency multiplier has a value of 2.22.

The digital interface and port 212 generally transmits digital data values to traffic radar systems. The digital interface and port 212 may include signal and/or data transmitting circuits, such as antennas, amplifiers, filters, mixers, oscillators, digital signal processors (DSPs), and the like. The digital interface and port 212 may establish communication through connectors or couplers that receive metal conductor wires or cables for protocols such as CAN, RS232 Serial, USB, or the like. Alternatively, or in addition, the digital interface and port 212 may establish communication wirelessly by utilizing radio frequency (RF) signals and/or data that comply with communication standards such as Bluetooth™, or Bluetooth™ low energy (BLE). In addition, the digital interface and port 212 may utilize communication standards such as Institute of Electrical and Electronics Engineers (IEEE) 802.11 standard such as WiFi, IEEE 802.16 standard such as WiMAX, cellular 2G, 3G, 4G, LTE, or 5G, or combinations thereof. The digital interface and port 212 receives the sequence of digital data speed values from the processing element 210 and transmits them as appropriate over a cable or wirelessly.

The analog interface and port 214 generally transmits the square wave electric voltage signal to traffic radar systems. The analog interface and port 214 may include electric circuitry such as amplifiers, filters, mixers, oscillators, electric voltage drivers, electric current drivers, and the like. Furthermore, the analog interface and port 214 may include one or more electrically conductive connectors to receive an external electrically conductive cable. Exemplary embodiments of the analog interface and port 214 include a common emitter transistor driver. In some embodiments, the analog interface and port 214 may be integrated with the processing element 210 so that the processing element 210 outputs the square wave electric voltage signal through the connector of the analog interface and port 214. The analog interface and port 214 outputs the square wave electric voltage signal continuously with a frequency that varies according to the speed value of the patrol vehicle 30. Alternatively, the analog interface and port 214 may output an electric voltage or electric current whose level varies according to the speed value of the patrol vehicle 30. Or, the analog interface and port 214 may output a pulse width modulated (PWM) signal whose pulse width, or duty cycle, varies according to the speed value of the patrol vehicle 30.

The speed sensor 200 may operate as follows. The speed sensor 200 is associated with a patrol vehicle 30 by being placed in, or on, the patrol vehicle 30. The processing element 210 initializes the other electronic components. The GNSS module 206 receives GNSS signals, such as GPS signals in the United States, and outputs a sequence of data packets, each data packet having a format shown in FIG. 12 and explained in FIG. 13. The processing element 210 receives each data packet, parses it, and examines the Speed Over Ground field, the Course Over Ground field, and the Mode field. The processing element 210 may convert the Speed Over Ground field value to units of miles per hour, if necessary. The processing element 210 communicates the Speed Over Ground field value as the speed of the patrol vehicle 30 in digital data format to the digital interface and port 212, which outputs the speed of the patrol vehicle 30 as a sequence of digital data values over a physical cable and/or in a wireless communication protocol. The processing element 210 also calculates a frequency, which varies according to the speed of the patrol vehicle for the square wave electric voltage signal. The analog interface and port 214 outputs the square wave electric voltage signal continuously with a frequency, calculated by the processing element 210, that changes as the speed of the patrol vehicle 30 changes. Some patrol vehicles 30 receive the speed of the patrol vehicle 30 from the digital interface and port 212, while other patrol vehicles 30 receive the speed of the patrol vehicle 30 from the analog interface and port 214. It is possible that still other patrol vehicles 30 receive the speed of the patrol vehicle 30 from both the digital interface and port 212 and the analog interface and port 214.

The processing element 210 compares the Speed Over Ground field value with the Course Over Ground field value to verify that the patrol vehicle 30 is stationary. The processing element 210 also compares the Speed Over Ground field value with the acceleration value from the accelerometer 204 to verify proper operation of both components. The processing element 210 analyzes the Mode field value. If the Mode field value is "A", then operation of the speed sensor 200 is normal. If the Mode field value is "N", then the speed data from the GNSS module 206 is not valid. As a result and an alternative to either not outputting a current speed or outputting an older, now incorrect, speed, the processing element 210 calculates the current speed of the patrol vehicle 30 using the previous speed of the patrol vehicle 30 and the current acceleration value from the accelerometer 204. The calculated speed is output by the digital interface and port 212 and the analog interface and port 214 as described above.

Figure 14:
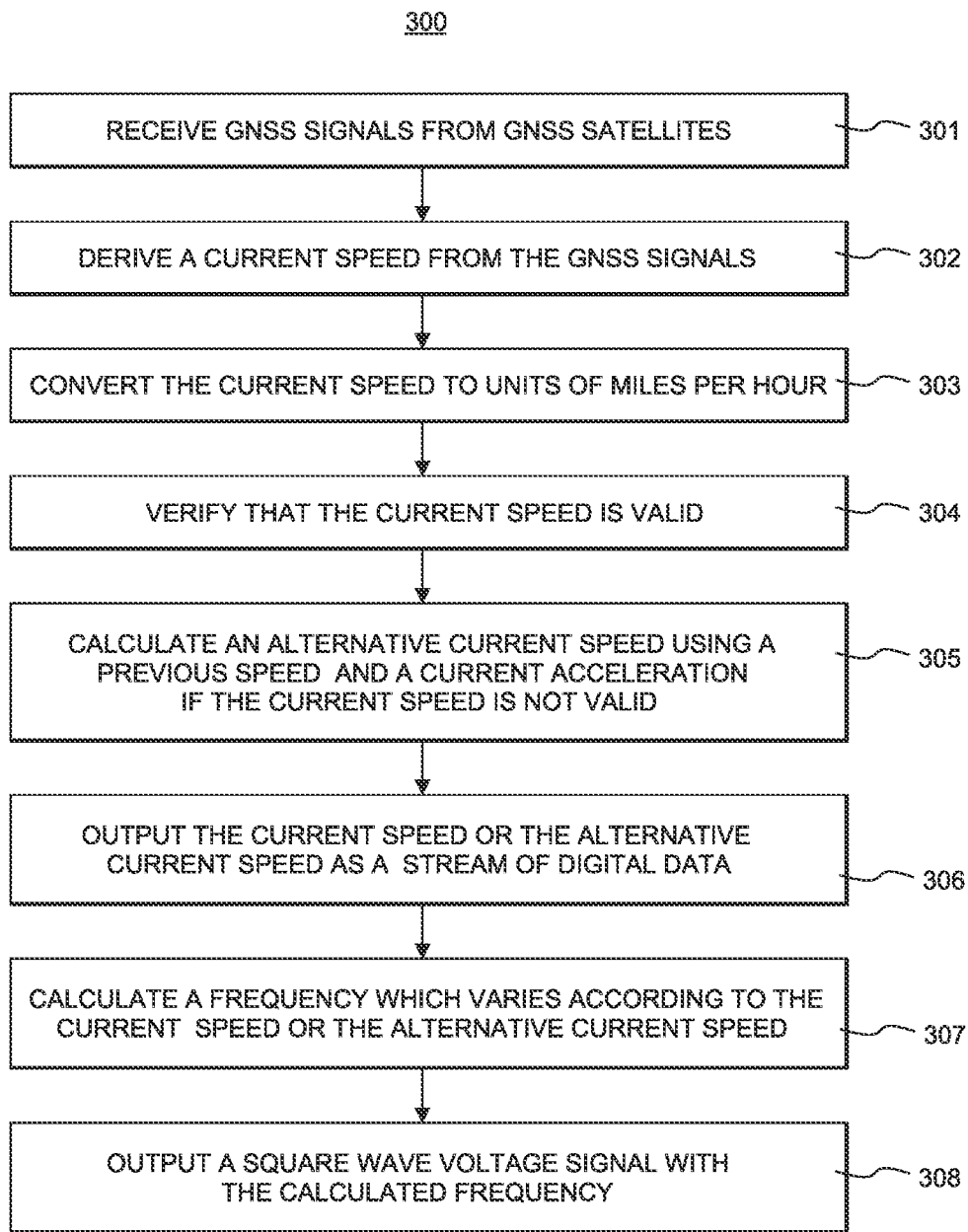
FIG. 14 includes a listing of at least a portion of the steps of a method for determining and outputting a speed of an associated patrol vehicle.

FIG. 14 depicts a listing of at least a portion of the steps of an exemplary method 300 for determining and outputting a speed of an associated patrol vehicle. The steps may be performed in the order shown in FIG. 14, or they may be performed in a different order. Furthermore, some steps may be performed concurrently as opposed to sequentially. In addition, some steps may be optional or may not be performed. The steps may be performed by the accelerometer 204, the GNSS module 206, the processing element 210, the digital interface and port 212, and the analog interface and port 214.

Referring to step 301, GNSS signals are received from GNSS satellites by the GNSS module 206. The GNSS module 206 includes a GNSS processor and a GNSS antenna configured to receive and process GNSS wireless signals, such as GPS signals in the United States.

Referring to step 302, a current speed is derived from the GNSS signals. The GNSS module 206 outputs a sequence of data packets, each data packet having a format shown in FIG. 12 and explained in FIG. 13. Each data packet includes a Speed Over Ground field whose value is the current speed of the patrol vehicle 30.

Referring to step 303, the speed data is converted to units of miles per hour (mph) by the processing element 210, if necessary.

Referring to step 304, the current speed is verified to be valid. The processing element 210 analyzes the Mode field value. If the Mode field value is "A", then operation of the speed sensor 200 is normal. If the Mode field value is "N", then the speed data from the GNSS module 206 is not valid.

Referring to step 305, an alternative current speed is calculated using a previous speed and a current acceleration. If the current speed is not valid, then the processing element 210 calculates the alternative current speed of the patrol vehicle 30 using a speed of the patrol vehicle from one of the previous data packets and the current acceleration value from the accelerometer 204. For example, the processing element 210 may calculate the patrol vehicle speed as: Alternative Current Speed=Previous Speed+(Acceleration× Time since Previous Speed).

Referring to step 306, the current speed or the alternative current speed is output as a digital data stream. The current speed or the alternative current speed is communicated from the processing element 210 to the digital interface and port 212, which outputs the speed of the patrol vehicle 30 as a sequence of digital data values over a physical cable and/or in a wireless communication protocol.

Referring to step 307, a frequency is calculated which varies according to the current speed or the alternative current speed. Some traffic radar systems may interpret the speed of the patrol vehicle 30 as the square wave frequency divided by a frequency multiplier. Thus, the processing element 210 may calculate the square wave frequency as the speed value multiplied by the frequency multiplier. In exemplary embodiments, the frequency multiplier has a value of 2.22.

Referring to step 308, a square wave voltage signal with the calculated frequency is output. The analog interface and port 214 outputs the square wave electric voltage signal continuously with the calculated frequency that changes as the speed of the patrol vehicle 30 changes. Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A speed sensor for determining and outputting a speed of an associated patrol vehicle, the speed sensor comprising:
   a global navigation satellite system (GNSS) module configured to receive GNSS wireless signals, process the GNSS wireless signals, and output a sequence of data packets, each data packet including the speed of the associated patrol vehicle;
   a processing element configured to
      receive the data packets, and
      extract the speed of the associated patrol vehicle from each data packet; and
   a port configured either to output the speed of the associated patrol vehicle as a sequence of digital data values, or to output the speed of the associated patrol vehicle as a varying frequency of a square wave electric voltage signal.

2. The speed sensor of claim 1, wherein, if the port is configured to output the speed of the associated patrol vehicle as a varying frequency of a square wave electric voltage signal, then the processing element is further configured to calculate the frequency as the calculated current speed of the associated patrol vehicle multiplied by a frequency multiplier or the speed of the associated patrol vehicle from the data packet multiplied by the frequency multiplier.

3. The speed sensor of claim 1, wherein the processing element determines whether a speed of the associated patrol vehicle is zero or non-zero according to data from the GNSS module.

4. The speed sensor of claim 1, wherein the processing element
   extracts a directional heading of the associated patrol vehicle from each data packet,
   determines a speed of the associated patrol vehicle is zero when a value of the directional heading is variable and data indicating the speed of the associated patrol vehicle is approximately zero for a plurality of consecutive data packets, and
   determines a speed of the associated patrol vehicle is non-zero when a value of the directional heading is constant and data indicating the speed of the associated patrol vehicle is non-zero for a plurality of consecutive data packets.

5. The speed sensor of claim 1, further comprising:
   an accelerometer configured to output acceleration data which varies according to an acceleration of the associated patrol vehicle; and
   the processing element is further configured to
      determine a validity of the speed of the associated patrol vehicle from each data packet,
      if the speed of the associated patrol vehicle from a current data packet is valid and if the port is configured to output the speed of the associated patrol vehicle as a varying frequency of a square wave electric voltage signal, then calculate the frequency using the speed from the data packet, and
      if the speed of the associated patrol vehicle from the current data packet is not valid, then perform the following steps:
         calculate a current speed of the associated patrol vehicle using acceleration data and a speed of the associated patrol vehicle from a previous data packet,
         communicate the calculated current speed of the associated patrol vehicle as a digital data value to the port if the port is configured to output the speed of the associated patrol vehicle as a sequence of digital data values, and
         calculate the frequency using the calculated current speed of the associated patrol vehicle if the port is configured to output the speed of the associated patrol vehicle as a varying frequency of a square wave electric voltage signal.

6. The speed sensor of claim 5, wherein the processing element compares changes in the speed of the associated patrol vehicle in sequential data packets with the acceleration data and outputs a signal or data to a user interface to indicate that there is an error in the operation of the speed sensor if the changes in the speed of the associated patrol vehicle do not correspond to nonzero acceleration data.

7. The speed sensor of claim 1, wherein if the port is configured to output the speed of the associated patrol vehicle as a sequence of digital data values, then the port outputs the speed of the associated patrol vehicle as the sequence of digital data values through an electrically conductive connector.

8. The speed sensor of claim 1, wherein if the port is configured to output the speed of the associated patrol vehicle as a sequence of digital data values, then the port outputs the speed of the associated patrol vehicle as the sequence of digital data values wirelessly using a wireless communication protocol.

9. A speed sensor for determining and outputting a speed of an associated patrol vehicle, the speed sensor comprising:

a global navigation satellite system (GNSS) module configured to receive GNSS wireless signals, process the GNSS wireless signals, and output a sequence of data packets, each data packet including the speed of the associated patrol vehicle;

a port configured either to output the speed of the associated patrol vehicle as a sequence of digital data values, or to output the speed of the associated patrol vehicle as a varying frequency of a square wave electric voltage signal; and a processing element configured to receive the data packets, extract a directional heading of the associated patrol vehicle from each data packet, determine a speed of the associated patrol vehicle is zero when a value of the directional heading is variable and data indicating the speed of the associated patrol vehicle is approximately zero for a plurality of sequential data packets, and determine a speed of the associated patrol vehicle is non-zero when a value of the directional heading is constant and data indicating the speed of the associated patrol vehicle is non-zero for a plurality of sequential data packets.

\* \* \* \* \*